(12) United States Patent
Munshi

(10) Patent No.: US 7,162,995 B2
(45) Date of Patent: Jan. 16, 2007

(54) METHOD FOR INJECTING GASEOUS FUELS INTO AN INTERNAL COMBUSTION ENGINE AT HIGH PRESSURES

(75) Inventor: Sandeep Munshi, Vancouver (CA)

(73) Assignee: Westport Power Inc., Vancouver (CA)

( * ) Notice: Subject to any disclaimer, the term of this patent is extended or adjusted under 35 U.S.C. 154(b) by 0 days.

(21) Appl. No.: 11/277,776

(22) Filed: Mar. 29, 2006

(65) Prior Publication Data

US 2006/0236975 A1    Oct. 26, 2006

Related U.S. Application Data

(63) Continuation of application No. PCT/CA2004/001767, filed on Sep. 30, 2004.

(51) Int. Cl.
*F02M 21/02* (2006.01)
(52) U.S. Cl. ............ 123/305; 123/526; 123/527; 123/27 GE
(58) Field of Classification Search ............. 123/305, 123/526, 527, 27 GE
See application file for complete search history.

(56) References Cited

U.S. PATENT DOCUMENTS

| | | | |
|---|---|---|---|
| 5,150,836 | A | 9/1992 | McKay et al. |
| 5,771,857 | A | 6/1998 | Willi |
| 6,708,905 | B1 | 3/2004 | Borissov et al. |
| 2001/0025892 | A1 | 10/2001 | McCoy et al. |
| 2004/0103877 | A1* | 6/2004 | Mccoy et al. ............ 123/305 |
| 2005/0284451 | A1* | 12/2005 | Uhde et al. ............ 123/525 |

FOREIGN PATENT DOCUMENTS

| | | |
|---|---|---|
| EP | 0083514 A1 | 7/1983 |
| WO | WO 02/02932 A1 | 1/2002 |

OTHER PUBLICATIONS

Miyake, M., et al., "The development of high output, highly efficient gas burning diesel engines", CIMAC ((International Council on Combustion Engines)), 1983.
Tice, J.K., et al., "Field Test and Development of a Low-Cost Mechanically Actuated, Enhanced Mixing System for Emissions Reduction", Gas Machinery Conference Proceedings, Oct. 2003, Salt Lake City.

* cited by examiner

*Primary Examiner*—Erick Solis
(74) *Attorney, Agent, or Firm*—McAndrews, Held & Malloy, Ltd.

(57) ABSTRACT

A method directly injects gaseous fuel into the combustion chamber of an internal combustion engine. The compressibility of the gaseous fuel is used to provide a fuel to the combustion chamber that is injected over all engine operating conditions at pressures that result in fuel jet speeds beyond the injector nozzle in excess of sonic speeds as determined in reference to the combustion chamber environment. The resulting fuel injection speed results in the fuel passing through shock waves within the combustion chamber, which, in turn, promotes combustion of the fuel by promoting turbulence and mixing of the fuel and intake charge within the combustion chamber where fuel burns in a non-premixed combustion mode.

23 Claims, 5 Drawing Sheets

METHOD FOR INJECTING GASEOUS FUELS INTO AN INTERNAL COMBUSTION ENGINE AT HIGH PRESSURES

CROSS-REFERENCE TO RELATED APPLICATION(S)

This application is a continuation of International Application No. PCT/CA2004/001767, having an international filing date of Sep. 30, 2004, entitled "Method For Injecting Gaseous Fuels Into An Internal Combustion Engine At High Pressures". International Application No. PCT/CA2004/001767 claimed priority benefits, in turn, from Canadian Patent Application No. 2,443,474 filed Sep. 30, 2003, and Canadian Patent Application No. 2,463,791 filed Apr. 7, 2004. International Application No. PCT/CA2004/001767 is hereby incorporated by reference herein in its entirety.

FIELD OF THE INVENTION

The present invention relates to a method for directly injecting gaseous fuels into a combustion chamber of an internal combustion engine to promote combustion of the gaseous fuel.

BACKGROUND OF THE INVENTION

Because of its ready availability, low cost and potential for reducing emissions, gaseous fuels have long been a promising substitute for liquid fuels for fuelling internal combustion engines. Natural gas is one example of such a gaseous fuel. Other examples include hydrogen, methane, ethane, propane, LPG, butane and mixtures of such gaseous fuels as well as gaseous fuel mixtures containing one or more of hydrogen, carbon monoxide and methane each of which can be produced synthetically.

In particular, replacing diesel fuel with gaseous fuels provides the potential for reducing emissions and lowering operating costs as diesel fuel burns with higher concentrations of pollutants and is generally more expensive than many gaseous fuels. The challenge, however, has been to substitute diesel fuel with gaseous fuels while maintaining the performance of diesel-fuelled engines including the efficiency of a diesel engine.

One way of maintaining the performance found in a diesel engine while using gaseous fuel is by directly injecting the fuel into a combustion chamber when the piston is near top dead center causing the fuel to burn in a diffusion combustion mode or in a stratified combustion mode where fuel and air are partially mixed.

Any direct injection engine benefits from techniques to ensure complete and efficient combustion of the fuel. Inefficient combustion results in higher emissions and reduced engine performance. Combustion in a diffusion combustion mode, in general, occurs at the fuel/air interface generally defined by the fuel jet. That is, the fuel has limited opportunity to mix with the intake air charge prior to combustion. Therefore, increasing the surface area of fuel exposed to the air charge helps promote combustion as more fuel is allowed to burn when desired during the early part of the power stroke. Diesel engines attempt to increase surface area between air and fuel to promote mixing and combustion by atomizing the diesel fuel and introducing mixing into the combustion chamber. For a gaseous fuel, atomization is not relevant, however; mixing is important for promoting combustion. Diesel-fuelled engine mixing is predominantly generated by the jet injection and the environment created by the geometry of the combustion chamber interacting with an intake charge drawn into the combustion chamber. This mixing can be important as well in promoting mixing of a gaseous-fuelled direct injection engine. The applicant, however, has found that, unlike diesel fuel, the properties of the gaseous fuel itself are useful for promoting mixing and, therefore, combustion.

As well as generally promoting combustion, variations in the fuel quality and charge properties influence combustion. Fuel quality can vary considerably for many gaseous fuels such as natural gas. One of the prior art methods of compensating for lower grade fuels (lower heating value) tends to encourage longer injection duration for direct injection engines and this technique is appropriate for gaseous fuels as well. However, long injection durations can negatively impact the efficiency of the engine. The same technique can be used in high exhaust gas recirculation (EGR) engines resulting in the same drawbacks.

One method of managing gaseous fuel mixing generally and a method for promoting combustion to adjust for the variations in the properties of the fuel (low quality fuel), intake charge (EGR levels) is to take advantage of the compressibility of the gaseous fuel. The compressibility of a gaseous fuel can be used to enhance combustion by enhancing mixing. As an additional benefit, the compressibility of gaseous fuels has also been found to extend the power range of gaseous-fuelled engines. While pressurizing gaseous fuels has been used previously-generally to force gaseous fuel into a combustion chamber (thereby utilizing the compressibility of the gaseous fuel), prior art has taught away from using a range of pressures take advantage of the compressibility of gases in order to promote combustion. By way of example, see Miyake M., et al., "The development of high output, highly efficient gas burning diesel engines", CIMAC, 1983. Generally, injection pressure (and consequently compressibility of the gaseous fuel) has been driven by the need to force gas into the combustion chamber at full load (see U.S. Pat. No. 5,771,857, column 4, line 39).

U.S. Pat. No. 6,708,905 recognizes the benefits of gaseous fuel compressibility under limited circumstance. The disclosure provides for an injector nozzle design for taking advantage of gaseous fuel compressibility at low pressures to deliver a supersonic gaseous fuel flow at the exit of the injector nozzle into a combustion chamber to promote shock wave turbulence of the gaseous fuel in the combustion chamber. The disclosed injector nozzle design provides for such fuel flow at relatively low pressures. The drawback of the design is, in general, the sought supersonic flow within the combustion chamber is dependent on the cylinder pressure which varies throughout the engine map. The injector design can only take advantage of shock wave turbulence of a supersonic flow over a discrete range of the engine map.

Similarly, Tice J. K., et al., "Field Test and Development of a Low-Cost Mechanically Actuated, Enhanced Mixing System for Emissions Reduction", *Gas Machinery Conference* (October, 2003: Salt Lake City), discusses supersonic gaseous fuel flow delivered by low pressure injector nozzle designs similar to those discussed in U.S. Pat. No. 6,708,905. As noted above, however, such an injector has limited application. Moreover, this publication teaches away from a high-pressure injection of gaseous fuel as undesirable for the reason that this art is directed at providing for a method of creating a homogeneous mixture of fuel and air for a spark ignited engine. There is no discussion of appropriate techniques for high pressure directly injected gaseous-fuelled engine designs that take advantage of the efficiencies found in diesel/compression ignition engines.

In the present technique, a gaseous fuel is introduced that utilizes the high pressure direct injection of gaseous fuel and the compressibility of the gaseous fuel to promote combustion over the range of the engine map resulting in enhanced power and compensating for poor fuel quality in gaseous-fuelled direct injection internal combustion engines.

SUMMARY OF THE INVENTION

The present method improves combustion, and provides greater fuel mass flow and gas momentum for a gaseous-fuelled direct injection internal combustion engine. By using the compressibility of gaseous fuels, the present method of using high pressure direct injection enhances combustion by enhancing mixing of the fuel, thereby reducing emissions further by ensuring more complete combustion. Also, by utilizing the compressibility of the gaseous fuel, the mass flow of fuel and momentum of the fuel can be increased resulting in more mixing of the fuel and the delivery of more power to the piston in a cycle of the engine when the additional fuel is burned within the combustion chamber.

In particular, in the present technique, a gaseous fuel is injected into a combustion chamber of an internal combustion engine at a pressure resulting in a pressure ratio as a function of the injection pressure and the cylinder pressure in excess of a critical pressure ratio beyond which gas flow is choked (gas speed is sonic) at injector nozzle exit and the gas injection speed becomes supersonic after exit from the injector (that is, an under-expanded gas jet). The supersonic gas speed results in shock wave turbulence and mixing within the combustion chamber, which can promote combustion of the fuel.

In a preferred embodiment of the present method, a gaseous fuel is introduced into a direct injection internal combustion. The method comprises, during a cycle of the engine, selecting an injection pressure for injecting the gaseous fuel into a charge at a charge pressure in a combustion chamber of the engine where the injection pressure results in an injection speed of the gaseous fuel beyond a nozzle of the injector. The injection speed is, throughout the injection duration, in excess of a sonic speed of the gaseous fuel in the charge at the charge pressure. The gaseous fuel is directly injected at the injection pressure for the injection duration into the charge at an injection crank angle near or at completion of the compression stroke of the cycle.

In a further embodiment of the above, the injection pressure preferably results in the injection speed being below a maximum penetration speed at which gas penetration into the combustion chamber will result in interference of the gaseous fuel with at least one of a cylinder and a piston, each of which partially defines the combustion chamber. The method can be practiced wherein the gaseous fuel comprises natural gas and the intake charge comprises air. In a further embodiment of the method, a ratio of the injection pressure and the charge pressure during the injection duration is in excess of a critical pressure ratio. In a preferred example, the fuel is natural gas, the intake charge is air and/or the pressure ratio is greater than 2.

In a further embodiment of the method, the fuel may comprise hydrogen and the intake charge comprises air, which, in a preferred example, comprises a second fuel selected from at least one of natural gas, hydrogen, methane and diesel fuel, and/or is the same as the gaseous fuel.

In a preferred embodiment of the method, the injection pressure varies throughout the injection duration. A gaseous fuel is introduced into a direct injection internal combustion engine. The method comprises, during a cycle of the engine, selecting an injection pressure for injecting the gaseous fuel into a charge in a combustion chamber of the engine where the injection pressure results in an injection speed of the gaseous fuel beyond a nozzle of the injector that reduces through at least one sonic barrier within the charge. The gaseous fuel is directly injected into the charge at the injection pressure for the injection duration at an injection crank angle near or at completion of the compression stroke of the engine cycle.

The injection pressure preferably varies throughout the injection duration and can be practiced where the gaseous fuel comprises natural gas and the intake charge comprises air.

A third embodiment of the method comprises, during a cycle of the engine, introducing a charge into a combustion chamber during an intake event of the cycle and compressing the charge within the combustion chamber during a compression event of the cycle to a charge pressure. At an injection crank angle near top dead center of the cycle near completion of the compression event, a gaseous fuel is directly injected at an injection pressure and for an injection duration into the charge. The ratio of the injection pressure to the charge pressure is greater than a critical ratio throughout the injection duration. The critical ratio is determined where a speed of the gaseous fuel within the charge is in excess of sonic speeds at the charge pressure. The directly injected gaseous fuel is ignited within the combustion chamber.

The method further comprises determining the charge pressure from at least one of engine load, speed, intake charge pressure or intake pressure, intake charge temperature, compression ratio and intake flow. The speed of the gaseous fuel within the charge is preferably in excess of sonic speeds throughout all engine operating conditions. In a preferred example the critical ratio is greater than 2. In a further example, the fuel burns in a non-premixed combustion mode.

BRIEF DESCRIPTION OF THE DRAWINGS

FIG. 1a shows an intake stroke of a cycle of an engine. FIG. 1b shows a compression stroke of a cycle of an engine. FIG. 1c shows an injection of fuel into a combustion chamber near the completion of a compression stroke of a cycle of an engine. FIG. 1d shows combustion of the fuel during a power stroke of a cycle of an engine. FIG. 1e shows an exhaust stroke of a cycle of an engine.

DETAILED DESCRIPTION OF PREFERRED EMBODIMENT(S)

In the present method, a selected injection pressure for a gaseous fuel used in a gaseous-fuelled direct injection internal combustion engine is in excess of the critical pressure at which the fuel speed after exiting the injector nozzle exceeds sonic speeds within the combustion chamber charge. At increasing gas injection pressures the fuel density increases within the nozzle and fuel flow remains choked, with sonic speed maintained at the nozzle exit. However, upon exit from the nozzle, supersonic speed are reached as the gas is allowed to expand from the nozzle opening into the intake charge within the combustion chamber.

Figure 1:
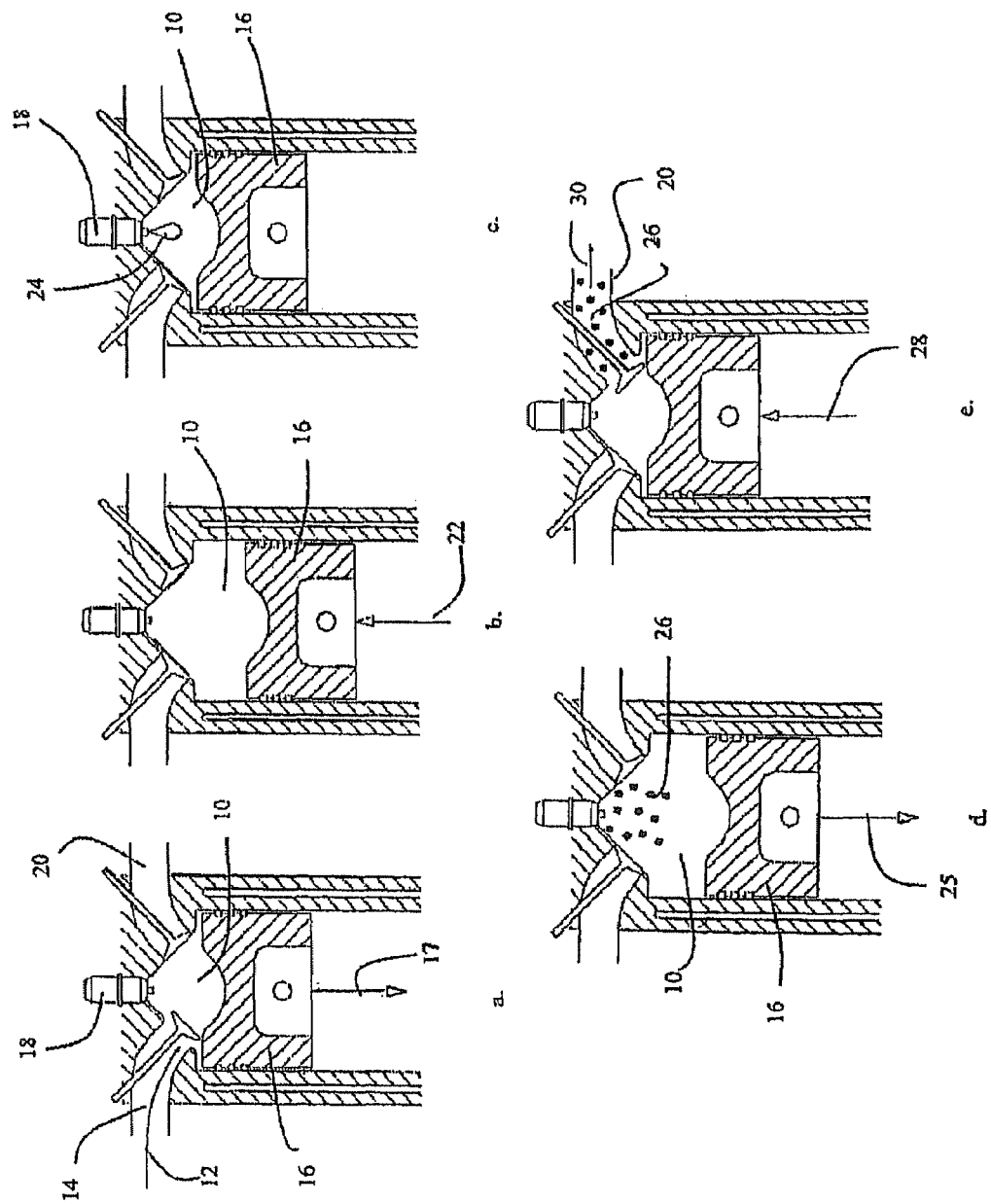
FIG. 1 shows five cross-sectional views of a combustion chamber at different points in a cycle of a gaseous-fuelled direct injection internal combustion engine.

Referring to FIG. 1, a cross-section of a combustion chamber providing the stages in a cycle of a typical gaseous-fuelled direct injection engine is shown. FIG. 1a shows an intake charge introduced into combustion chamber 10 through intake line 14 in direction 12. At the same time, piston 16 is, during the intake stroke, moving in direction 17 away from injector 18, which is disposed in a fire deck and in fluid communication with combustion chamber 10. Also shown is exhaust line 20. FIG. 1b illustrates piston 16 moving in direction 22 compressing the charge within the combustion chamber during the compression stroke of the engine to a pre-combustion cylinder pressure. Referring to FIG. 1c, fuel 24 is then introduced into combustion chamber 10 when the piston is at or near top dead center. Fuel 24 is introduced into combustion chamber 10 at a gas injection pressure, $P_g$, from injector 18. For the purposes of this disclosure, injection of fuel near or at top dead center is generally within 30 crank angle degrees on either side of top dead center.

Soon after introduction of fuel 24, and referring to FIG. 1d, the fuel burns, as indicated by combustion products 26, thereby driving piston 16 in direction 25. The gaseous fuel can be auto-ignited or ignited by an ignition source (not shown). Such sources include a spark, a pilot fuel (liquid spark ignition) that is more auto-ignitable than the gaseous fuel and a hot surface situated within combustion chamber 10. Auto-ignition of the gaseous fuel generally requires high compression ratios or high intake manifold temperatures as many gaseous fuels have a relatively high auto-ignition temperature.

Finally, referring to FIG. 1e, the cycle of the engine is completed with the exhaust stroke wherein combustion products 26 are driven from the combustion chamber into exhaust line 20 in direction 30 by action of piston 16 moving in direction 28.

Figure 2:
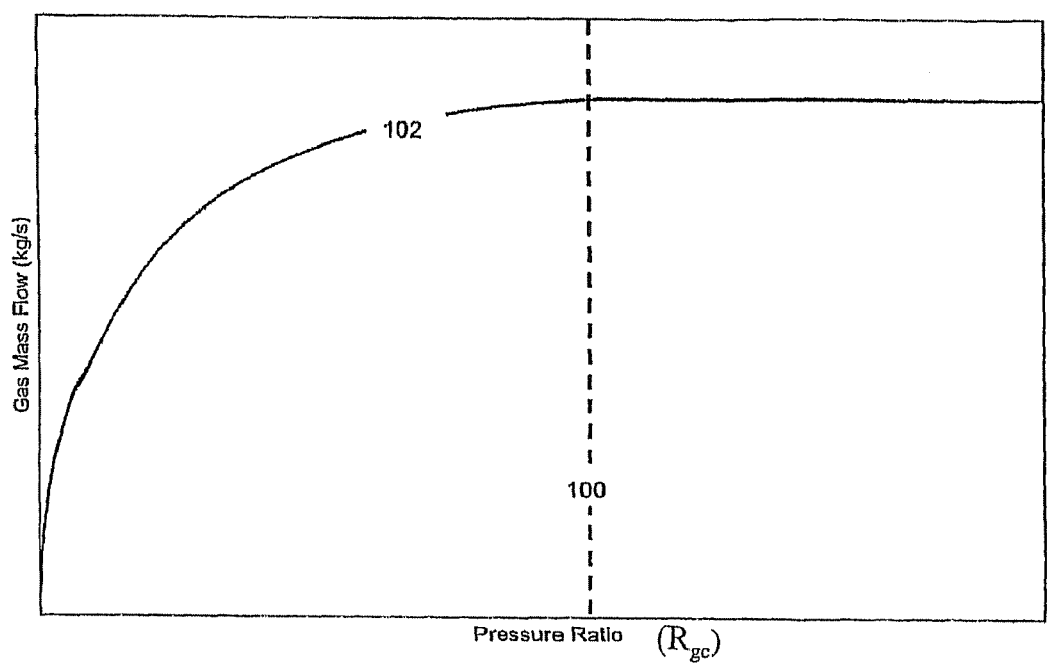
FIG. 2 is a graph of mass flow of a gaseous fuel through an injector nozzle plotted against the pressure ratio of fuel pressure and cylinder pressure.

Referring to FIG. 2, in general, at the intersection of line 100 and curve 102, the gas pressure ratio boundary is identified above which the gaseous fuel flows from the injector nozzle at supersonic speeds driven by expansion of the gas through one or more shock waves generated within the jet near the nozzle exit and accompanied by additional turbulence of the gas slowing through the shock waves. This is known as shock wave turbulence. Supersonic speed or flow is measured relative to the local speed of sound within the combustion chamber fluid. The region to the right of line 100 along on line 102, resulting in supersonic flow once the gas is released from the injector nozzle, and results when the ratio, $R_{gc}$, satisfies:

$$R_{gc} > R_c \quad (1)$$

for a given cylinder pressure, $P_{cyl}$, where $R_{gc} = P_g/P_{cyl} > R_c$ wherein the gas pressure, $P_g$, provides for supersonic gas speed from said nozzle. $R_c$ is the critical pressure ratio defining line 100 in FIG. 2 (beyond which the flow is choked at nozzle exit), for a given gas density and intake charge density above which supersonic flow occurs within the combustion chamber upon exit of the gas from the injector nozzle. Supersonic flow is measured based on the local speed of sound for the jet.

At pressure ratios higher than $R_c$ the exit pressure of the gas is well above $P_{cyl}$, and the remaining expansion of the jet takes place outside the nozzle. As a result, the axial decay in gas concentration behaves as if it were produced by a larger source than the actual exit diameter of the nozzle (see Birch et al., "The Structure and Concentration Decay of High Pressure Jets of Natural Gas", *Combustion Science and Technology*, Volume 36, pages 249–261, 1984). Effectively, this provides for a means of expanding the nozzle diameter over a range of engine operating conditions by increasing the pressure at which the gas is delivered such that it exits the nozzle at a supersonic speed.

Figure 3:
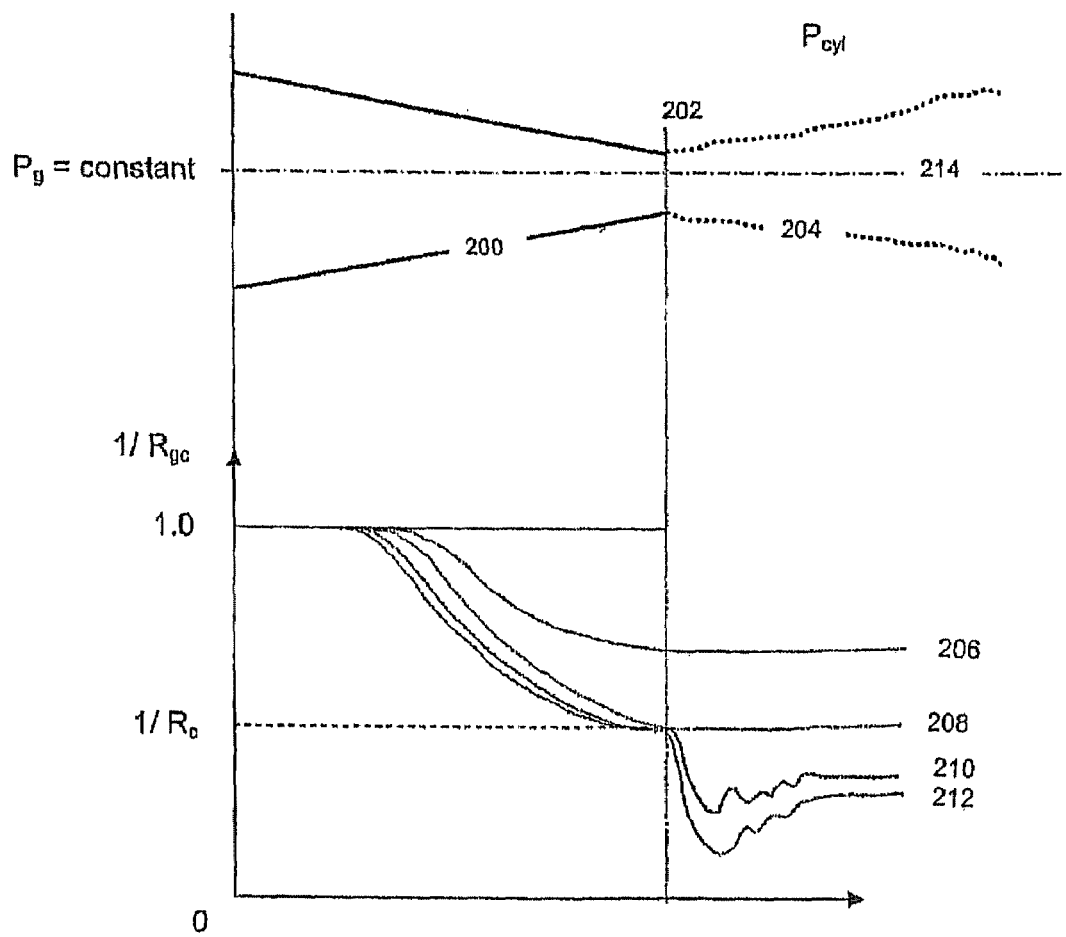
FIG. 3 is a graph of pressure ratio of fuel pressure and cylinder pressure against distance from injector nozzle.

Referring to FIG. 3, injector nozzle 200 is shown. The boundary between nozzle 200 and the combustion chamber is provided by line 202 beyond which gas jet boundary 204 is shown. In this example of a preferred embodiment of the subject method, $P_g$ is kept constant. Below this cross-sectional figure of the nozzle, $1/R_{gc}$ is plotted against distance from line 202 demonstrating the inverse of $R_{gc}$ during a fuel injection event for a sub-critical $R_{gc}$, line 206, a critical $R_{gc}$ where $R_{gc} = R_c$, line 208, and super-critical $R_{gc}$, lines 210 and 212, all for a constant gas pressure $P_g$. Fuel midpoint 214 is also shown.

Figure 4:
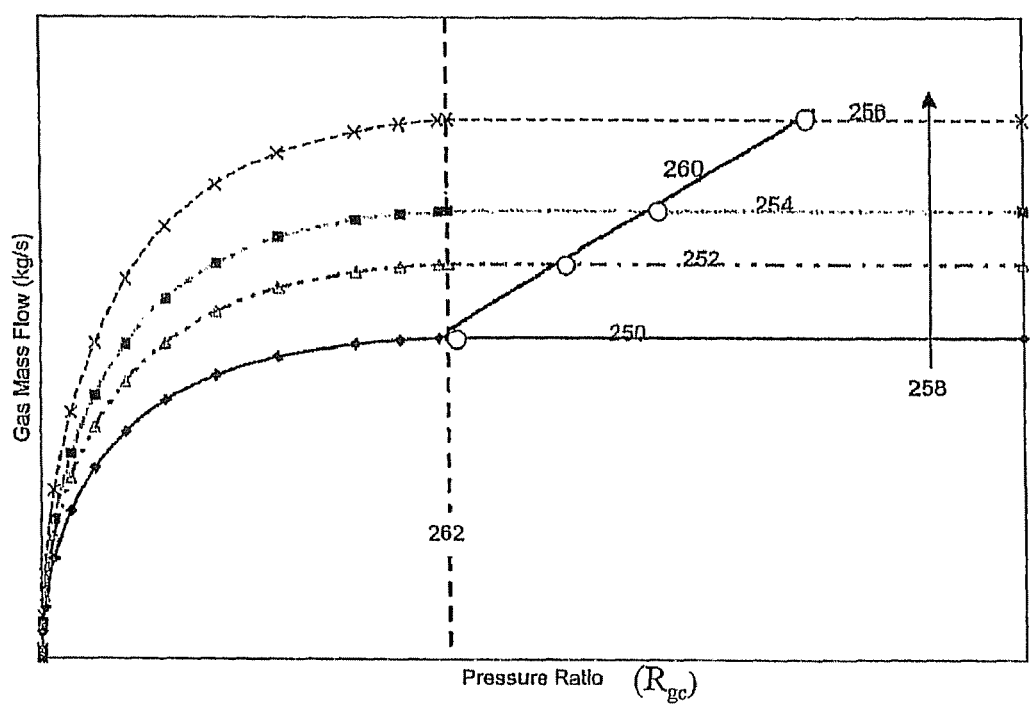
FIG. 4 is a graph of gas mass flow against pressure ratio of fuel pressure and cylinder pressure for different fuel injection pressures.

Referring to FIG. 4, gas mass flow from injector 18 is plotted against $R_{gc}$. Four lines are provided for different injection pressures. Lines 250, 252, 254 and 256 each represents an injection pressure ($P_g$) greater than the previous injection pressure following the trend indicated by line 258. Operating line 260 demonstrates the influence on gas mass flow of increasing gas pressure for a given $P_{cyl}$. $R_c$ is depicted by line 262.

Figure 5:
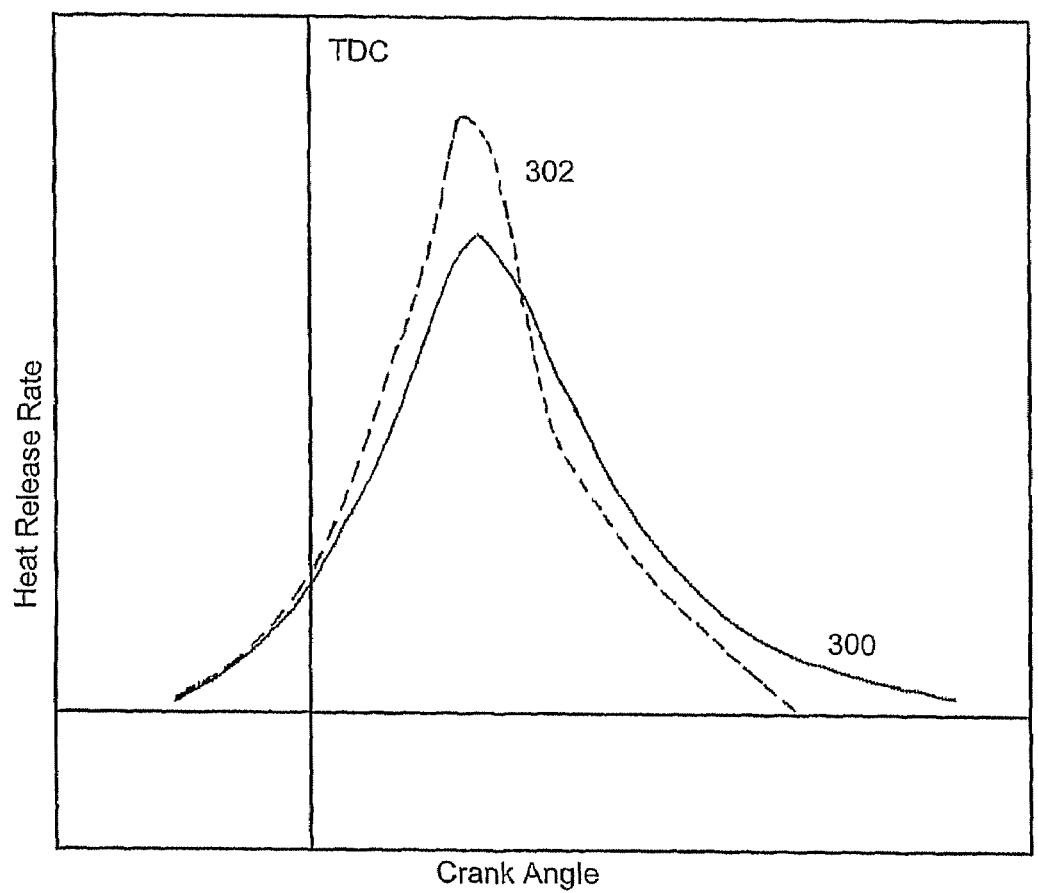
FIG. 5 is a graph of heat release rate plotted against crank angle representing subsonic gas speeds and supersonic gas speeds.

Referring to FIG. 5, the heat release rate (HRR) is plotted against crank angle. Curve 300 provides the HRR resulting where the gaseous fuel is injected into the combustion chamber at a pressure resulting in sonic or subsonic gas speed once the gas leaves the nozzle of the injector. Curve 302 provides the HRR resulting where the gaseous fuel is injected into the combustion chamber at a pressure resulting in supersonic gas speed once the gas leaves the nozzle of the injector. Line 300 represents the resulting HRR where $R_{gc}$ is less than or equal to $R_c$. Line 302 represents the resulting HRR where $R_{gc}$ is greater than $R_c$.

In practice, referring to FIG. 4, an $R_{gc}$ in excess of $R_c$ shows increasing gas mass flow and momentum for increasing $P_g$ as operating line 260 moves through different pressure ratio curves. As a result, additional fuel energy can be delivered to the combustion chamber in a given cycle with gas injection pressures providing for $R_{gc}$ in excess of $R_c$ for a given curve (see lines 250 through 256). As noted above this can be important where the quality of the gaseous fuel is poor as this method allows the energy density to be increased by increasing the density of the fuel by compressing it further while it escapes choked through the nozzle.

Moreover, referring to FIG. 3, $R_{gc}$ above $R_c$ for an excess gas pressure is considered to promote mixing due to increased jet momentum of injected gas jet 24 (see FIG. 1), bounded by line 204, slows through one or more shock waves within the jet.

It is preferable that the relationship $R_{gc} > R_c$ be maintained at high load for the engine. Here, increased mass flow and mixing as a result of increased jet momentum are important as the energy limits are otherwise being met by limitations on combustion rate and fuel mass flow rate. Increased fuel mass flow rate provides potential for additional power provided the additional fuel is allowed to burn efficiently. Additional mixing and momentum help combustion. Therefore, while the benefits of supersonic flow are realized when the gas pressure results in supersonic flow where the cylinder pressure is not at a peak pressure in a given cycle, the full advantages taught are not realized. A pressure ratio in excess of $R_c$, over all engine operating conditions results in quick and efficient combustion while delivering additional power to the engine when needed.

By way of example, a typical $P_g$ greater than 30 MPa with a $P_{cyl}$ of 15 MPa (an $R_{gc}$ greater than 2) would generally provide the pressures necessary for supersonic flow into the combustion chamber of a natural gas fuelled direct injection engine. In most cases $P_g$ for most combustion chambers and operating conditions for the engine would be in excess of 10 MPa.

Referring to FIG. 5, it can be seen that the HRR where the injection pressure results in gas speed that is supersonic upon leaving the injector nozzle results in quicker heat release within the combustion chamber indicating better mixing and quicker combustion of the desired quantity of fuel to be burned in the combustion chamber. This helps to ensure better energy transfer to the piston and can, in some cases, result in more complete combustion with associated fewer emissions such as CO and hydrocarbons.

Injectors capable of managing the required $P_g$ are important. There is, however, no need to deal with supersonic gas speeds within the injector itself as the flow is choked at sonic speed until it exits the nozzle. Increased pressures within the injector result in increased compression or increased density of the gaseous fuel within the injector.

Engine geometry should be considered to determine the preferred range of $R_{gc}$. That is, beyond a given $R_{gc}$, where $R_{gc}=R_{max}$, interference of the gas with the walls of the combustion chamber due to over-penetration may negatively impact combustion quality. This is also a function of injection angle. Again depending on the combustion chamber geometry, the injection angle will help to determine the upper limit for $P_g$ that would result in the type of interference of the gas with the walls of the combustion chamber that might negatively impact on combustion efficiency. In general, $R_{max}$ varies with combustion chamber geometry and the fuel injection angle. Preferably, $R_{gc}$ should approach $R_{max}$, while the gas injection pressure(s) avoids a result wherein gas would interfere with the cylinder walls or piston on either side of the peak cylinder pressure during the fuel injection period. One way of doing this would be to control the injection pressure during a cycle using rate shaping techniques such that it followed combustion chamber pressure thereby introducing fuel at supersonic flow approaching $R_{max}$ and resulting in a relatively constant $R_{gc}$.

Typically, an engine controller would consider the load demands (by way of example, boost pressure or throttle position or pedal position) on the engine from which it would determine a $P_{cyl}$, either by real-time calculation of $P_{cyl}$, measurement of $P_{cyl}$ or a signal indicative of $P_{cyl}$, or a map based approached provided to the controller during calibration of the engine. The determined $P_{cyl}$ would then dictate $P_g$. In any event, $P_g$ should, where practicing the subject matter of the disclosure, result in an $R_{gc}$ satisfying $R_c<R_{gc}<R_{max}$.

$P_g$ can be controlled to a constant pressure for a give range of load and speed conditions appropriate for the nozzle size used to inject fuel. That is, as would be understood by a person skilled in the art, the pressure chosen for $P_g$ would ensure appropriate flow at lower loads and/or higher speeds such that injection time would not become prohibitively short according to the injector design. An objective of the disclosure is to teach that supersonic flow beyond the nozzle and proximate to the nozzle can be met when $P_{cyl}$ is at a maximum at full load conditions.

The relationship where $R_c<R_{gc}<R_{max}$ is satisfied should preferably occur over the whole injection period which considers the point on the engine map where peak cylinder pressure is reached at the highest load for the engine. It is at this point on the engine map that improved mixing and increased mass flow of fuel is important as combustion energy is supplemented by the mass flow and mixing that helps speed heat release to efficiently drive the piston.

For the purposes of this disclosure, an under-expanded fuel jet refers to a gaseous fuel jet that has sonic speed at the exit of the nozzle and it accelerates to supersonic speed after exit from the nozzle and proximate to the nozzle eventually slowing down through one or more shock waves and creating further turbulence and associated mixing with the surrounding fluid.

The subject matter of this disclosure is directed to an engine in which fuel is injected at high pressure (over 10 MPa) towards the end of the compression stroke or at the beginning of the power stroke. The resulting fuel jet once ignited is characterized by non-premixed combustion mode which would include a diffusion combustion mode and stratified combustion mode. Also, for many gaseous fuels an ignition source is important where the compression ratio of the engine does not provide for compression ignition. Examples of such ignition sources include pilot fuel ignition (liquid spark) or hot surface ignition. For the purposes of this disclosure an injection near the end of the compression stroke or near top dead center includes an injection within 30 crank angle degrees of top dead center within the compression stroke or within the power stroke.

The subject matter of this disclosure is operable where EGR is used and where the intake charge includes a pre-mixed quantity of fuel. The same principles will result in the advantages taught above where supersonic gaseous fuel flow is used.

For the purposes of this disclosure, gaseous fuels includes, but are not limited to, natural gas, hydrogen, methane, ethane, propane, LPG and butane and mixtures of such gaseous fuels.

For the purposes of this disclosure, the present method is applicable to two-stroke and rotary cycle engines. Therefore, references to the various stages of a four-stroke engine noted above, namely, intake, compression, power and exhaust strokes includes the corresponding stages of a cycle of a two-stroke engine and the corresponding stages of a cycle of a rotary engine, namely, the intake, compression, power and exhaust events of such an engine.

While particular elements, embodiments and applications of the present disclosure have been shown and described, it will be understood, of course, that the disclosure is not limited thereto since modifications may be made by those skilled in the art without departing from the scope of the present disclosure, particularly in light of the foregoing teachings.

What is claimed is:

1. A method of introducing a gaseous fuel into a high pressure direct injection internal combustion engine, said method comprising, during a cycle of said engine:
    (a) selecting an injection pressure for injecting said gaseous fuel from an injector into a charge at a charge pressure within a combustion chamber of said engine, said injection pressure resulting in an under-expanded gaseous fuel jet beyond and proximate to a nozzle of said injector, said fuel jet expanding at an injection speed beyond and proximate to said nozzle, said injection speed being, throughout an injection duration, in excess of a sonic speed of said gaseous fuel in said charge at said charge pressure;

(b) at an injection crank angle near or at completion of a compression stroke of said cycle, directly injecting said gaseous fuel at said injection pressure for said injection duration into said charge, while avoiding substantial interference between said fuel jet and at least one of a cylinder and a piston, each of which partially defines said combustion chamber.

2. The method of claim 1 wherein said injection pressure results in said injection speed being below a maximum penetration speed at which gas penetration into said combustion chamber will result in interference of said fuel jet with said at least one of said cylinder and said piston.

3. The method of claim 2 wherein said gaseous fuel comprises natural gas and an intake charge comprises air.

4. The method of claim 1 wherein a ratio of said injection pressure and said charge pressure during said injection duration is in excess of a critical pressure ratio.

5. The method of claim 4 wherein said fuel is natural gas and an intake charge is air.

6. The method of claim 5 wherein said pressure ratio is greater than 2.

7. The method of claim 1 wherein said fuel comprises hydrogen and an intake charge comprises air.

8. The method of claim 1 wherein an intake charge comprises a second fuel.

9. The method of claim 8 wherein said second fuel is selected from at least one of natural gas, hydrogen, methane and diesel fuel.

10. The method of claim 8 wherein said second fuel is the same as said gaseous fuel.

11. The method of claim 1 wherein said injection pressure varies throughout said injection duration.

12. A method of introducing a gaseous fuel into a direct injection internal combustion engine, said method comprising, during a cycle of said engine:

(a) selecting an injection pressure for injecting said gaseous fuel from an injector into a charge in a combustion chamber of said engine, said injection pressure resulting in an under-expanded fuel jet accelerating to a supersonic injection speed beyond and proximate to a nozzle of said injector, said injection speed reducing through at least one shock wave within said charge;

(b) at an injection crank angle near or at completion of a compression stroke of said cycle, directly injecting said gaseous fuel at said injection pressure for an injection duration into said charge, while avoiding substantial interference between said fuel jet and at least one of a cylinder and a piston, each of which partially defines said combustion chamber.

13. The method of claim 12 wherein said injection pressure varies during said injection duration.

14. The method of claim 12 wherein said injection pressure is in excess of 10 MPa.

15. The method of claim 12 wherein said gaseous fuel comprises natural gas and said intake charge comprises air.

16. A method of operating a direct injection gaseous fuelled internal combustion engine, said engine defining a combustion chamber, said method comprising, during a cycle of said engine:

(a) introducing a charge into a combustion chamber during an intake event of said cycle;

(b) compressing said charge within said combustion chamber during a compression event of said cycle to a charge pressure;

(c) at an injection crank angle near top dead center of said cycle near completion of said compression event, directly injecting a gaseous fuel at an injection pressure and for an injection duration into said charge, the ratio of said injection pressure to said charge pressure being greater than a critical ratio throughout said injection duration, said critical ratio being determined where said injection pressure results in an under-expanded fuel jet accelerating to a speed within said charge in excess of sonic speeds, directly injecting said gaseous fuel while avoiding substantial interference between said fuel jet and at least one of a cylinder and a piston, each of which partially defines said combustion chamber; and (d) igniting said directly injected gaseous fuel within said combustion chamber.

17. The method of claim 16 further comprising determining said charge pressure from at least one of engine load, speed, throttle position, intake pressure, intake charge temperature, compression ratio and intake flow, wherein said charge pressure is used to determine said injection pressure.

18. The method of claim 16 wherein said speed of said fuel jet within said charge proximate to an injector for injection of said fuel, is in excess of sonic speeds throughout an engine map for said engine.

19. The method of claim 16 wherein said critical ratio is greater than 2.

20. The method of claim 16 wherein said injection pressure is in excess of 10 MPa.

21. The method of claim 16 wherein said directly injected gaseous fuel burns in a non-premixed combustion mode.

22. The method of claim 21 wherein said directly injected gaseous fuel burns in a stratified combustion mode.

23. The method of claim 21 wherein said directly injected gaseous fuel burns in a diffusion combustion mode.

* * * * *